UNITED STATES PATENT OFFICE 2,042,053

REFINING HYDROCARBON OILS AND VAPORS

Charles O. Hoover, San Antonio, Tex., assignor to Bennett-Clark Co., Inc., San Antonio, Tex., a corporation of Texas Application March 26, 1932, Serial No. 601,403

14 Claims. (Cl. 196—28)

The present invention relates to process for the treatment of hydrocarbon or mineral oils, both heavy and light, especially oils known as naphthas, gasoline, kerosene, water whites, raffinate, gas oil, furnace oil, solvent oils and the like, for removing or altering sour compounds, said sour compounds usually being considered to be organic sulphur compounds of the type of mercaptans, and relates to process for also producing polymerization of the gum forming constituents in the oils and the removal of the polymers. The process produces a sweet oil having a lowered gum content. The oils treated in accordance with the present method or process, may be treated either in the liquid or vapor phase, with or without prior treatment with sulphuric acid, preferably without the treatment with sulphuric acid.

Oils treated in accordance with the present invention, are, after treatment, not only sweet to the doctor test, but also have a low gum content; good anti knock value, good stability, good color and improved odor.

The invention is described in connection with the apparatus illustrated in the accompanying drawing, which shows apparatus in which the invention may be practiced, it being understood, however, that I do not limit myself to the apparatus shown, as the invention may be practiced in various forms of apparatus.

Figure 1:
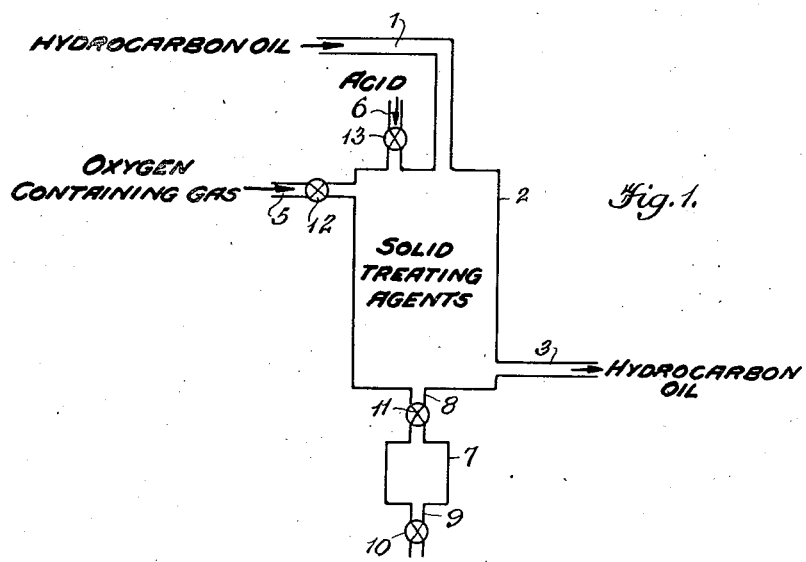
Figure 2:
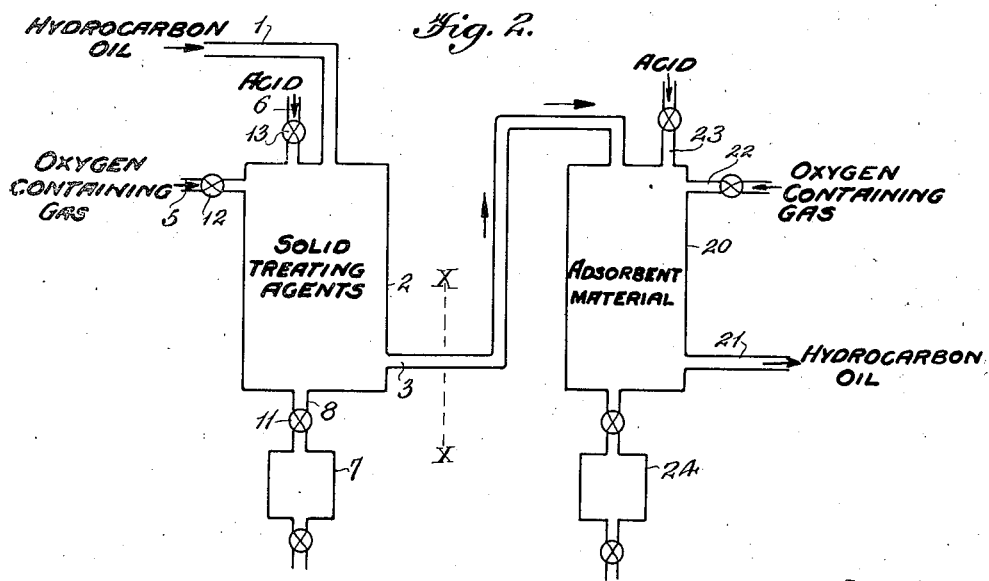

Figure 1 in the drawing shows apparatus in which one modification of the invention may be practiced, and Figure 2 shows apparatus in which other modifications of the invention may be practiced.

Referring to Figure 1, the oil to be treated enters the pipe I in the form of a vapor. The vapors entering the pipe I may be lead directly as vapor from the still or cracking units without condensation to a liquid, or if a liquid product is desired to be treated it may be first vaporized. The pipe I leads into a chamber 2 in which is placed a compound, salt, or material having an affinity for sulphur, sulphur compounds or sour compounds in the oils. Preferably compounds and salts of metals are employed in which the metal may assume different valencies or degrees of oxidation and be reduced from a higher to a lower valency by sour or sulphur compounds in the oils. Among the compounds which may be employed may be mentioned cupric oxide, cupric chloride, cupric nitrate, mercuric chloride, ferric chloride, ferric sulphate, cuprous oxide, cuprous nitrate, mercurous chloride, ferrous chloride, ferrous sulphate, cobaltous and cobaltic chloride, cadmium chloride, mercurous and mercuric nitrate, cupric hydroxide, cupric carbonate, cupric acetate, magnesium oxide and magnesium hydroxide and the like. These compounds are supported in any suitable way in the chamber 2 so that the vapors of oils come in intimate contact therewith. After the oil vapors have contacted with the compounds in chamber 2 the vapors are lead out of the chamber 2 by means of the pipe 3 and condensed in any suitable manner to the liquid phase.

Air or oxygen or an oxygen containing gas or any other equivalent oxidizing agent is introduced into the chamber 2 through pipe 5 and mixed with the vapors passing through the chamber 2. The air, oxygen or oxygen containing gas added is preferably substantially dry or free from moisture. The purpose of this oxygen is to regenerate, revivify, maintain or prolong the activity of the compounds in the chamber 2. The oxidizing agents may be introduced into the chamber 2 concurrently with the oil vapors, or they may be passed through the chamber 2 after discontinuing the flow of vapors or after temporarily arresting them.

It is advantageous to add a small amount of an acid into the chamber 2 while the oil vapors are undergoing treatment. The acid is preferably one which contains the negative radical of the metal compound. Thus in the case of cupric chloride it would be hydrochloric acid, in the case of cupric nitrate it would be nitric acid, and sulphuric acid in the case of sulphates. The addition of acid promotes the maintenance of the activity of the compounds used. The acids are preferably added in the substantially anhydrous condition; thus when hydrochloric acid is used, dry hydrochloric acid gas is used, and concentrated sulphuric or sulphur trioxide used when sulphuric acid is added. The acid is added to the chamber 2 through the pipe 6. The oxidizing agent and acid should be added in sufficient amount to maintain or prolong the activity of the compounds and at the same time obtain a good color in the product resulting from the condensation of vapor passing out through the pipe 3. The amounts of acid and oxidizing agents will vary with different oils stocks operated upon and therefore no specific amounts can be given for all oils. The operator will readily be able to regulate the amounts of oxidizing agent and acid by trial.

Instead of using the compounds mentioned above alone in the chamber 2, there may be employed said compounds in admixture with an adsorbent or absorbent material, for example, carbon, active carbon, silica gel, adsorbent clays such as fuller's earth, bentonite and the like. When an adsorbent like adsorbent clay is used which produces polymerization of gum forming constituents in the oil, the chamber 2 is provided with a trap or polymer pot 7 which is connected to the lower part of the chamber 2 by means of the pipe 8, which pot 7 is used to collect the polymers which accumulate in the chamber 2. The polymer pot 7 is provided with a valved controlled outlet 9. A heating jacket may be provided about the chamber 2 to maintain the temperature sufficiently high in the chamber 2 to retain the oils in the vapor phase, or heating coils may be provided within the chamber for the same purpose.

When an adsorbent or absorbent is used together with the compounds mentioned the percentage of adsorbent may be varied within wide limits according to the oil stock treated. The percentage of adsorbent or absorbent may vary from zero per cent to 95 per cent and over.

An oxidizing agent, such as potassium permanganate or manganate, manganese dioxide, ammonium persulphate, sodium peroxide, barium peroxide, etc. may be added to the compounds used in the chamber 2 or to the mixture of such compounds with the adsorbents above described. About 5 to 10 per cent of such oxidizing agents may be employed.

The numerals 10, 11, 12, and 13 indicate valves respectively in pipes 9, 8, 5, and 6 for controlling the passage of the materials therethrough.

Referring to Figure 2, the apparatus at the left of line X X is the same as the apparatus shown in Figure 1. The chamber 2 in Figure 2 is filled with the same materials as in the case of Figure 1, and oxygen and acid are introduced into the chamber 2 respectively through pipes 5 and 6. In operating with the apparatus shown in Figure 2, the hydrocarbon oil is introduced either in the form of liquid or vapor through the pipe 1 into the chamber 2. The hydrocarbon oil or vapor passes from the chamber 2 by means of the pipe 3. The pipe 3 discharges into a chamber 20 containing an adsorbent or absorbent material, such as active carbon, silica gel, fuller's earth, bentonite and the like. The hydrocarbon passing into the chamber 3 is caused to pass through or intimately in contact with the adsorbent in the chamber 20. The treated hydrocarbon leaves the chamber 20 by means of the pipe 21. The purpose of the chamber 20 and the materials therein is to remove from the hydrocarbon metallic organic compounds (mercaptides) produced in chamber 2 but not retained therein. Pipe 22 is provided to introduce dry air, dry oxygen or an oxygen containing gas within the chamber 20 either during the passage therein of the hydrocarbons or after the flow of the hydrocarbons therein has been discontinued or temporarily arrested. Pipe 23 is for the purpose of introducing an acid of the same kind introduced through pipe 6 into chamber 2 of Figure 1 and for the same purpose. The acid and oxidizing agent introduced into chamber 20 through pipes 22 and 23 are for the purpose of maintaining or prolonging the activity of the adsorbent material within the chamber 20. A polymer pot 24 is also connected at the base of the chamber 20 for a similar purpose as polymer pot 7 shown in Figure 1. Either or both of chambers 2 and 20 may be provided with heating means, as in the case of chamber 2 in Figure 1, to maintain elevated temperatures within either or both of the chambers. Acid and oxidizing agents may be admitted through the pipes 6, 5, 23, and 22 into either or both of chambers 2 and 20 in Figure 2 depending upon the sulphur and sour constituents content of the oil or stock treated and upon the particular oil stock treated. When the hydrocarbon oil is introduced into the chambers 2 of Figure 1 and Figure 2, either in the form of vapor or liquid, it is introduced into said chambers substantially dry or free from water, and the materials employed in the chambers 2 are used in the solid or dry condition. The presence of water or water vapor impairs the action of the agents employed in the chambers 2 and 20.

The oxidizing agents and acid may be admitted through pipes 5 and 6, and 22 and 23 in both figures either continuously or intermittently according to requirements and the addition of acid may be discontinued or arrested during the addition of oxidizing agent or oxygen gas. The addition of acid may be discontinued after losses of acid or negative radicals in the chambers 2 have been made up or compensated.

The materials used in chambers 2 in Figures 1 and 2 and in chamber 20 of Figure 2 are used in the dry condition and preferably finely divided to 30 to 60 mesh and 60 to 90 mesh, 30 to 60 mesh being an advantageous size for use on account of the fact that no considerable back pressure is produced upon percolation or passage of the oils or vapors through it.

Having described my invention, I claim

1. The process of refining a hydrocarbon containing sour constituents which comprises contacting said hydrocarbon, either in the form of liquid or vapor, with a material having an affinity for sour constituents in the hydrocarbon and forming mercaptides therewith and thereafter in a separate step contacting said hydrocarbon containing mercaptides formed with an adsorbent material in the presence of gaseous oxygen.

2. The process of refining a hydrocarbon containing sour constituents which comprises contacting said hydrocarbon, either in the form of liquid or vapor, with a metal compound which reacts with sour constituents to form mercaptides in the hydrocarbon, thereafter in a separate step contacting said hydrocarbon with an adsorbent material to remove mercaptides formed and contained therein and subjecting said adsorbent material to the action of an oxidizing agent to prolong its activity.

3. The process of refining hydrocarbons containing mercaptans which comprises contacting said hydrocarbons, either in the form of liquid or vapor, with a metal compound which forms mercaptides with such mercaptans, whereby mercaptides are formed in said hydrocarbons, thereafter contacting said hydrocarbons, either as a liquid or vapor and in a separate step, with an adsorbent material and subjecting said adsorbent material to the action of an oxidizing agent to prolong its activity.

4. The process of refining sour hydrocarbon oil which comprises contacting said oil with a material which reacts with the sour constituents to form metallic organic compounds containing sulphur in said oil, and then contacting, in a separate step, the oil containing such compounds with an adsorbent material in the presence of oxygen.

5. The process of refining sour hydrocarbon oil which comprises contacting said oil with a material capable of forming mercaptides with the sour constituents to form mercaptides, thereafter contacting, in a separate step, the oil containing mercaptides with an adsorbent material in the presence of oxygen.

6. The process of removing sour constituents from hydrocarbon oil which comprises contacting said oil with solid cupric chloride, substantially in the absence of water, to form mercaptides in the oil and thereafter, in a separate step subjecting the oil to contact with an adsorbent material to remove mercaptides, and treating the said adsorbent material with oxygen.

7. The process of treating hydrocarbon vapors to refine same including the sweetening thereof which comprises bringing said vapors in the presence of oxygen in contact with a solid salt acting as a carrier for oxygen, substantially in the absence of added reducing agent materially affecting the effect of the oxygen.

8. The process of sweetening sour hydrocarbon oil which comprises contacting said sour oil with a body of an agent which forms mercaptides with sour constituents in the oil and afterwards while the said oil contains mercaptides, contacting it with a body of adsorbent material in the presence of a gaseous fluid containing oxygen.

9. The method of refining a hydrocarbon oil containing sour constituents, which comprises contacting said hydrocarbon oil, either in the liquid or vapor phase, and in the presence of an oxygen-containing gas, with a metal compound which reacts with sour constituents to form mercaptides in the oil, thereafter in a separate step contacting said hydrocarbon oil with an oxygen-containing gas and a solid adsorbent material, thereby removing the said mercaptides.

10. The process of removing mercaptans from hydrocarbon vapors containing mercaptans which comprises bringing said vapors in the presence of gaseous oxygen added thereto into contact with a solid metal compound which reacts with said mercaptans and which is maintained active by said oxygen, said contact being performed substantially in the absence of added reducing agent materially affecting the effect of said oxygen to maintain the activity of said metal compound.

11. The process of removing mercaptans from hydrocarbon vapors containing mercaptans which comprises bringing said vapors in the presence of gaseous oxygen added thereto into contact with a solid compound of copper which reacts with said mercaptans and which is maintained active by said oxygen, said contact being performed substantially in the absence of added reducing agent materially affecting the effect of said oxygen to maintain the activity of said copper compound.

12. The process of removing mercaptans from hydrocarbon vapors containing them which comprises bringing said vapors in the presence of gaseous oxygen added thereto into contact with a mixture comprising an adsorbent material and a solid compound of a metal which reacts with mercaptans and which is maintained active by said oxygen in the presence of said adsorbent material, said contact being performed substantially in the absence of added reducing agent materially affecting the effect of said oxygen to maintain the activity of said metal compound.

13. The process of removing mercaptans from hydrocarbon vapors containing them which comprises bringing said vapors in the presence of gaseous oxygen added thereto into contact with a mixture comprising an adsorbent material and a solid compound of copper which reacts with mercaptans and which is maintained active by said oxygen in the presence of said adsorbent material, said contact being performed substantially in the absence of added reducing agent materially affecting the effect of said oxygen to maintain the activity of said copper compound.

14. The process of removing mercaptans from hydrocarbon vapors containing them which comprises subjecting said vapors to the action of a mixture comprising an adsorbent material and solid copper chloride in the presence of added gaseous oxygen.

CHARLES O. HOOVER.